(12) United States Patent
Tomelleri

(10) Patent No.: US 7,765,707 B2
(45) Date of Patent: Aug. 3, 2010

(54) CONNECTION DEVICE FOR ARTICULATED ARM MEASURING MACHINES

(75) Inventor: Raffaele Tomelleri, Villafranca (IT)

(73) Assignee: Nikon Metrology NV, Heverlee (BE)

( * ) Notice: Subject to any disclaimer, the term of this patent is extended or adjusted under 35 U.S.C. 154(b) by 193 days.

(21) Appl. No.: 12/217,988

(22) Filed: Jul. 10, 2008

(65) Prior Publication Data

US 2010/0005673 A1      Jan. 14, 2010

(51) Int. Cl.
*G01B 5/004* (2006.01)
(52) U.S. Cl. .............................. 33/503; 33/1 PT; 33/556
(58) Field of Classification Search .................. 33/503, 33/1 PT, 556–561
See application file for complete search history.

(56) References Cited

U.S. PATENT DOCUMENTS

| | | | | |
|---|---|---|---|---|
| 4,676,002 A | * | 6/1987 | Slocum | 33/1 PT |
| 5,829,148 A | * | 11/1998 | Eaton | 33/503 |
| 6,931,745 B2 | * | 8/2005 | Granger | 33/503 |
| 7,614,157 B2 | * | 11/2009 | Granger | 33/503 |
| 7,624,510 B2 | * | 12/2009 | Ferrari | 33/503 |
| 2009/0013547 A1 | * | 1/2009 | Ferrari et al. | 33/503 |
| 2009/0013548 A1 | * | 1/2009 | Ferrari | 33/503 |

* cited by examiner

*Primary Examiner*—Yaritza Guadalupe-McCall
(74) *Attorney, Agent, or Firm*—Amster, Rothstein & Ebenstein LLP

(57) ABSTRACT

The present invention concerns a connection device for use in an articulated apparatus comprising two or more tandemly arranged interconnected movable segments, for limiting rotation between two adjoining segments connected by a joint having a single axis of rotation, comprising: a spring assembly comprising one or more helical torsion springs, which assembly has a first end and a second end, configured for placement co-axially along the joint axis of rotation; a stop pin adapted for attachment to one adjoining segment, another stop pin adapted for attachment to the other adjoining segment, each pin moveable around the axis of rotation in fixed relation to the attached segment, wherein the first end of the spring assembly is configured for disengageable connection with the stop pin of one segment, and the second end is configured for disengageable connection with the stop pin of the other segment, such that the degree of rotation by the one segment about the joint axis relative to the other segment is limited as spring assembly engages both pins, and by the torque induced in the spring assembly.

7 Claims, 1 Drawing Sheet

CONNECTION DEVICE FOR ARTICULATED ARM MEASURING MACHINES

The present invention concerns connection device having a smooth limitation of the rotation of the joints of manual CMM arms.

BACKGROUND

A manual co-ordinate measurement (CMM) arm, well known in the art, is an instrument formed from a plurality of tandemly connected segments whereby the last segment has a large range of motion and its position and orientation can be determined with accuracy through encoders which measure the angles adopted between the segments. They are manufactured by Faro Inc., Cimcore or Metris, and employed in the measurement of objects. A CMM arm is made of several segments, usually 6 or 7, each linked by joints allowing rotation of the segment around one or more axes.

For some joints, it is important that the degree of rotation is without limit because an operator may wish to take advantage from rotating the segment in one direction when performing a measurement without encountering any mechanical end stop. For example, when a laser scanner is attached to the last segment of the CMM arm, it is desirable to have the last two segments in a coaxial arrangement, and the joint between these two segments disposed with an infinite degree of rotation i.e. the joint can make one or more complete turns from 360 deg. U.S. Pat. No. 5,829,148 describes a manual CMM arm where the rotation of some joints is unlimited.

On the other hand, there are certain joints for which unlimited rotation is not essential, because the operator does not need to infinitely rotate the axis in one direction when performing a measurement. Therefore, he would not encounter any mechanical end stop at either end of a stroke during normal operations.

When an infinite rotation connection device is needed, well-known slip ring devices which are electrically conductive, are used instead of cables to transmit the electrical signals and power between segments. The slip rings relying on mechanical contact with a brush, however, are subject to wear and tear. Further, they are prone to interference which reduces the quality of the signal and may reduce the accuracy of the arms. Slips rings are also expensive and fragile.

The use of slip rings is avoided for joints having a limited number of rotations. In this this case, a better accuracy is obtained. The accuracy of joints with limited rotation is further improved because the mechanical contact between successive segments can be achieved using ball bearings (or any other type of bearing). In addition, cabling is sufficient to transmit power and/or data thereby reducing the problem of interference. Moreover, the cost of the joint is reduced.

For joints with a limited number of rotations, it is usually sufficient to have approximately one full rotation, so that the operator can reach any angle in the range 0 through 360 deg; nevertheless, in certain cases it is better to reach an angle higher than 360 deg. A total rotation angle higher than 360° can be achieved e.g. with multiple rotation rings. U.S. Pat. No. 6,931,745 describes such a device.

When the rotation is at its limit, one end stop attached to the first segment comes in contact with a second end stop attached to the second segment. The contact between the end stops produces a collision and a shock that are unpleasant for an operator. Moreover, the shock introduces stresses on the segments or the joint which can reduce the accuracy of the device. Moreover, a shock carrying excessive force may physically damage the joint.

INVENTION

Unless defined otherwise, all technical and scientific terms used herein have the same meaning as is commonly understood by one of skill in the art. All publications referenced herein are incorporated by reference thereto. All United States patents and patent applications referenced herein are incorporated by reference herein in their entirety including the drawings.

The articles "a" and "an" are used herein to refer to one or to more than one, i.e. to at least one of the grammatical object of the article. By way of example, "a pin" means one pin or more than one pin.

The recitation of numerical ranges by endpoints includes all integer numbers and, where appropriate, fractions subsumed within that range (e.g. 1 to 5 can include 1, 2, 3, 4 when referring to, for example, a number of springs, and can also include 1.5, 2, 2.75 and 3.80, when referring to, for example, measurements). The recitation of end points also includes the end point values themselves (e.g. from 1.0 to 5.0 includes both 1.0 and 5.0)

The objective of the invention is to provide a connection device for use in an articulated apparatus comprising two or more tandemly arranged interconnected movable segments, that solves the above mentioned limitations. More precisely, the connection device allows a joint between two adjoining segments having a single axis of rotation to perform a finite number of rotations but to avoid shocks when the rotation reaches its limit.

These objectives, and more as will turn out from the following description, are realised, according to the invention, with a solution characterised by that:

1. the axis of the joint between two segment is endowed with a helical torsional spring;
2. the joint axis has one stop pin on one segment;
3. the joint axis has one stop pin on the other segment.

One embodiment of the invention is a connection device for use in an articulated apparatus comprising two or more tandemly arranged interconnected movable segments, for limiting rotation between two adjoining segments connected by a joint having a single axis of rotation, comprising:

a spring assembly comprising one or more helical torsion springs, which assembly has a first end and a second end, configured for placement co-axially along the joint axis of rotation, a stop pin adapted for attachment to one adjoining segment, another stop pin adapted for attachment to the other adjoining segment, each pin able to move around the axis of rotation in fixed relation to the attached segment, wherein the first end of the spring assembly is configured for disengageable connection with the pin of one segment, and the second end is configured for disengageable connection with the pin of the other segment, such that the degree of rotation by the one segment about the joint axis relative to the other segment is limited when spring assembly engages both pins and by the torque induced in the spring assembly.

The present invention is here below further explained in some preferred embodiments that are to be considered in all respects as illustrative and not restrictive, with reference made to the attached drawings, where:

Figure 1:
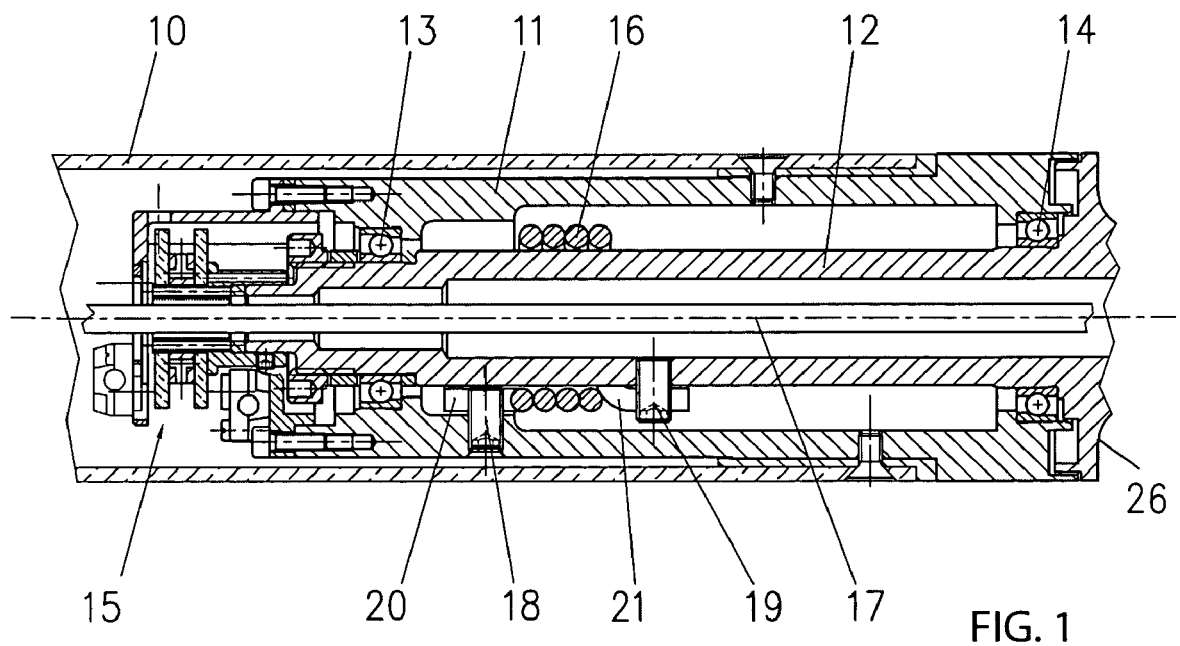
FIG. 1 shows a cross section of a joint between two segments having a single axis of rotation, the axis endowed with a spring assembly comprising one helical spring.

FIG. 1 schematically shows the mechanical limitations of an axis of a CMM arm, in which a segment 10 comprising an internal housing 11 to which the segment is fixed. In the housing 11 are two bearings 13 and 14 that support a rotating shaft 12 connected to the second segment 26, which arrangement realizes the joint with a single axes of rotation, whose angle is measured by means of a transducer 15. Inside the shaft 12 is a hole though which wires 17 pass.

Around the shaft 12 is a spring assembly comprising a single helical torsion spring 16, with a certain amount of clearance along the radial direction that allows it to rotate; the two ends of the spring are bent and point to the axial direction, as shown by the first (left) end 20 curve and the second (right) end 21 curve.

At the first end 20 is a pin 18 fixed to a housing 11 of the first segment 10, that allows the first (left) end of the spring to rotate almost 360° with respect to the housing without the pin 18 engaging and inducing torque in the spring 16. At the opposite end of the spring is a second pin 19 fixed to the shaft 12 of the second segment 26, that allows the shaft to further rotate almost 360° in relation to the spring without the pin 19 engaging and inducing the spring 16. The pin may be threaded for attachment to the segments.

The total possible rotation of the shaft with respect to the housing is of almost two complete rotations before the pins 18, 19 engage and induce torque in the spring assembly; it is the relative positions of the ends 20, 21 of the spring assembly, and the diameter of the two threaded pins that prevent rotation from reaching 720°. For maximum rotation, the curved ends of the spring will both be aligned on the same radial line of the spring.

At the limit of the rotation, the first end 20 of the spring is in disengagable contact with the pin 18 while the second end 21 is in disengagable contact with the threaded pin 19: no shock occurs because the elasticity of the spring is capable of absorbing the torque and prevents collision.

The axis behaves the same when a limit is reached for rotation in either direction, with a gentle limitation of the rotation avoiding any possible damage.

The spring assembly may comprise one spring. According to one aspect of the invention, the spring assembly comprises two, three, four, five, six, seven, eight, nine, or 10 or more helical torsion springs, arranged co-axially and adjacently whereby the mutual (adjacent) ends of the springs are in disengagable connection, such that rotation by first end of the spring assembly is transmitted to the second end through the two or more helical torsion springs.

Figure 2:
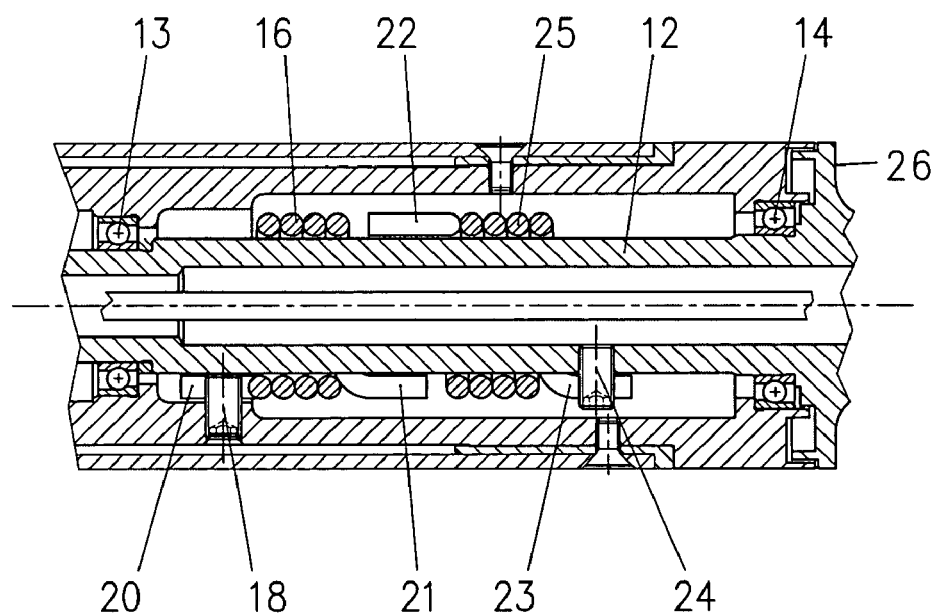
FIG. 2 shows a cross section of a joint between two segments having a single axis of rotation, the axis endowed with a spring assembly comprising two helical springs.

FIG. 2 schematically shows the mechanical limitation of an axis of an articulated arm measuring machine, by the spring assembly comprising two springs instead of just one single spring.

Around the shaft 12 and between the two bearings 13 and 14 is another helical spring 25, having both ends 22 and 23 curved.

The mutual ends of the springs 16, 25 i.e. second (right) end 21 of the first spring 16 and the first (left) end 22 of second spring 25 are at the same level that said ends disengagably connect by revolution of one spring relative to the adjacent spring around the axis of rotation.

The second (right) end 23 of the second spring is at the level of the threaded pin 24 and therefore limits to almost 360° the rotation of the second spring in relation of the shaft 12. The first (left) end 20 of the first spring 16 forms the first end of the spring assembly, while the second (right) end 23 of the second spring 25 forms the second end of the spring assembly.

In total the two springs limit the rotation of one segment, in relation to the other segment, to almost three rotations, apart from the reduction due to diameters of both the springs and the threaded pins.

The two springs smoothly stop the rotation of the shaft at both ends of rotation limits thanks to their capacity to elastically absorb torque.

The requirements of helical torsional spring will depend on the size of the segments and the expected torques. The skilled person will understand that spring properties can be adjusted according to the type of material, the process of manufacturing, the number of turns, the diameter of the wire and the diameter of the spring. Guidance as to their formulation and properties may be sought, for example, from "Spring Design Manual" published by SAE International, ISBN Number: 978-1-56091-680-2, published February 1996.

Other Embodiments

The above description was made in reference with a CMM arm but the present invention may be used with other devices requiring an accurate rotational joint. These include a robot, and a robot CMM arm.

The springs or pins may be electronically connected to the device with an electronic interface such that the interface may send a signal when the springs are spanned or when the springs come into contact with the pins. When a CMM arm is used, the electronic circuitry of the CMM arm may then stop acquiring data upon reception of such a signal.

Other types of springs may be used.

The present invention has been illustrated and described in some preferred embodiments, but it is intended that variations in the execution are still possible, within the scope and the protection of the present patent for industrial invention.

Certain Embodiments of the Invention

One embodiment of the invention is a connection device for use in an articulated apparatus comprising two or more tandemly arranged interconnected movable segments, for limiting rotation between two adjoining segments connected by a joint having a single axis of rotation, comprising:

a spring assembly comprising one or more helical torsion springs, which assembly has a first end and a second end, configured for placement co-axially along the joint axis of rotation, a stop pin adapted for attachment to one adjoining segment, another stop pin adapted for attachment to the other adjoining segment, each pin moveable around the axis of rotation in fixed relation to the attached segment, wherein the first end of the spring assembly is configured for disengageable connection with the stop pin of one segment, and the second end is configured for disengageable connection with the stop pin of the other segment, such that the degree of rotation by the one segment about the joint axis relative to the other segment is limited as spring assembly engages both pins, and by the torque induced in the spring assembly.

One embodiment of the invention is a connection device for use in an articulated apparatus comprising two or more tandemly arranged interconnected movable segments, for limiting rotation between two adjoining segments, comprising:

a joint having a single axis of rotation, adapted for connecting said two adjoining segment, a spring assembly comprising one or more helical torsion springs, which assembly has a first end and a second end, configured for placement co-axially along the joint axis of rotation, a stop pin adapted for attachment to one adjoining segment, another stop pin adapted for attachment to the other adjoining segment, each pin moveable around the axis of rotation in fixed relation to the attached segment, wherein the first end of the spring assembly is configured for disengageable connection with the stop pin of one segment, and the second end is configured for disengageable connection with the stop pin of the other segment, such that the degree of rotation by the one segment about the joint axis relative to the other segment is limited as spring assembly engages both pins, and by the torque induced in the spring assembly.

Another embodiment of the invention is a connection device as described above, wherein the spring assembly comprises two or more helical torsion springs, arranged co-axially and adjacently whereby the mutual ends of the springs are in disengagable connection, such that rotation by first end of the spring assembly is transmitted to the second end when the mutual ends (21, 22) of the springs are engaged.

Another embodiment of the invention is a connection device as described above, further comprising a sensor configured to detect when the torque induced in the spring assembly has reached or exceeded a defined limit.

Another embodiment of the invention is a connection device as described above, wherein the articulated device is a manual co-ordinate measurement (CMM) arm.

Another embodiment of the invention is an articulated apparatus comprising two or more tandemly arranged interconnected movable segments, for limiting rotation between two adjoining segments connected by a joint having a single axis of rotation, comprising a connection device as defined in any of claims 1 to 4.

Another embodiment of the invention is an articulated apparatus as described as above that is a manual co-ordinate measurement (CMM) arm.

Another embodiment of the invention is an articulated apparatus as described as above, configured to stop acquisition of data from the CMM arm after torque induced in the spring assembly reaches or exceeds a defined limit.

The invention claimed is:

1. A connection device for use in an articulated apparatus comprising two or more tandemly arranged interconnected movable segments, for limiting rotation between two adjoining segments connected by a joint having a single axis of rotation, comprising:

a spring assembly comprising one or more helical torsion springs (16), which assembly has a first end (20) and a second end (21), configured for placement co-axially along the joint axis of rotation, a stop pin (18) adapted for attachment to one adjoining segment (10), another stop pin (19) adapted for attachment to the other adjoining segment (26), each pin moveable around the axis of rotation in fixed relation to the attached segment, wherein the first end (20) of the spring assembly is configured for disengageable connection with the stop pin (18) of one segment (10), and the second end is configured for disengageable connection with the stop pin (19) of the other segment (26), such that the degree of rotation by the one segment (10) about the joint axis relative to the other segment (19) is limited as spring assembly engages both pins (18, 19), and by the torque induced in the spring assembly.

2. Connection device according to claim 1, wherein the spring assembly comprises two or more helical torsion springs (16, 25), arranged co-axially and adjacently whereby the mutual ends (21, 22) of the springs are in disengagable connection, such that rotation by first end (20) of the spring assembly is transmitted to the second end (23) when the mutual ends (21, 22) of the springs are engaged.

3. Connection device according to claim 1, further comprising a sensor configured to detect when the torque induced in the spring assembly has reached or exceeded a defined limit.

4. Connection device according to claim 1 wherein the articulated device is a manual co-ordinate measurement (CMM) arm.

5. An articulated apparatus comprising two or more tandemly arranged interconnected movable segments, for limiting rotation between two adjoining segments connected by a joint having a single axis of rotation, comprising a connection device as defined in claim 1.

6. An articulated apparatus comprising according to claim 5 that is a manual co-ordinate measurement (CMM) arm.

7. An articulated apparatus according to claim 6, configured to stop acquisition of data from the CMM arm after torque induced in the spring assembly reaches or exceeds a defined limit.

* * * * *